No. 797,018. PATENTED AUG. 15, 1905.
DE WITT C. PRESCOTT.
BAND SAW GUIDE.
APPLICATION FILED OCT. 1, 1904.

2 SHEETS—SHEET 1.

Witnesses
Chas. B. Gillson
Wm. M. Cathre.

Inventor
DeWitt C. Prescott
By Louis K. Gibson
Atty.

No. 797,018. PATENTED AUG. 15, 1905.
DE WITT C. PRESCOTT.
BAND SAW GUIDE.
APPLICATION FILED OCT. 1, 1904.

2 SHEETS—SHEET 2.

Witnesses.
Chas. B. Gillson.
Wm. M. Cathcart.

Inventor.
DeWitt C. Prescott.
By Louis K. Gillespie, Atty.

UNITED STATES PATENT OFFICE.

DE WITT C. PRESCOTT, OF CHICAGO, ILLINOIS.

BAND-SAW GUIDE.

No. 797,018.

Specification of Letters Patent.

Patented Aug. 15, 1905.

Application filed October 1, 1904. Serial No. 226,798.

*To all whom it may concern:*

Be it known that I, DE WITT C. PRESCOTT, a citizen of the United States, and a resident of Chicago, county of Cook, and State of Illinois, have invented certain new and useful Improvements in Band-Saw Guides, of which the following is a specification and which are illustrated in the accompanying drawings, forming a part thereof.

The invention relates to the lower guide for band-saws, particularly such as are employed in the manufacture of lumber; and its object is to provide a construction in which the guide comprises a pair of movable jaws with means for simultaneously actuating them.

It consists of the structure hereinafter described, and which is illustrated in the accompanying drawings, in which—

Figure 1:
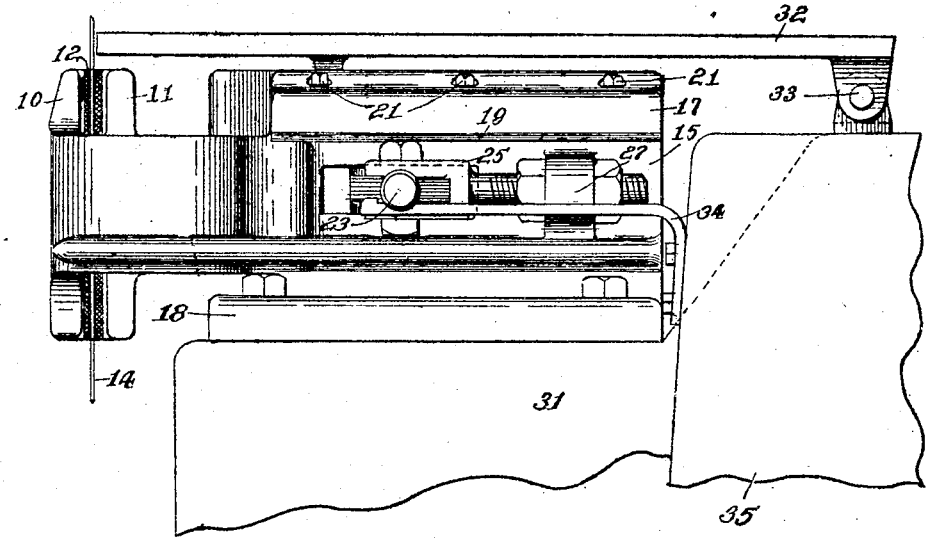
Figure 2:
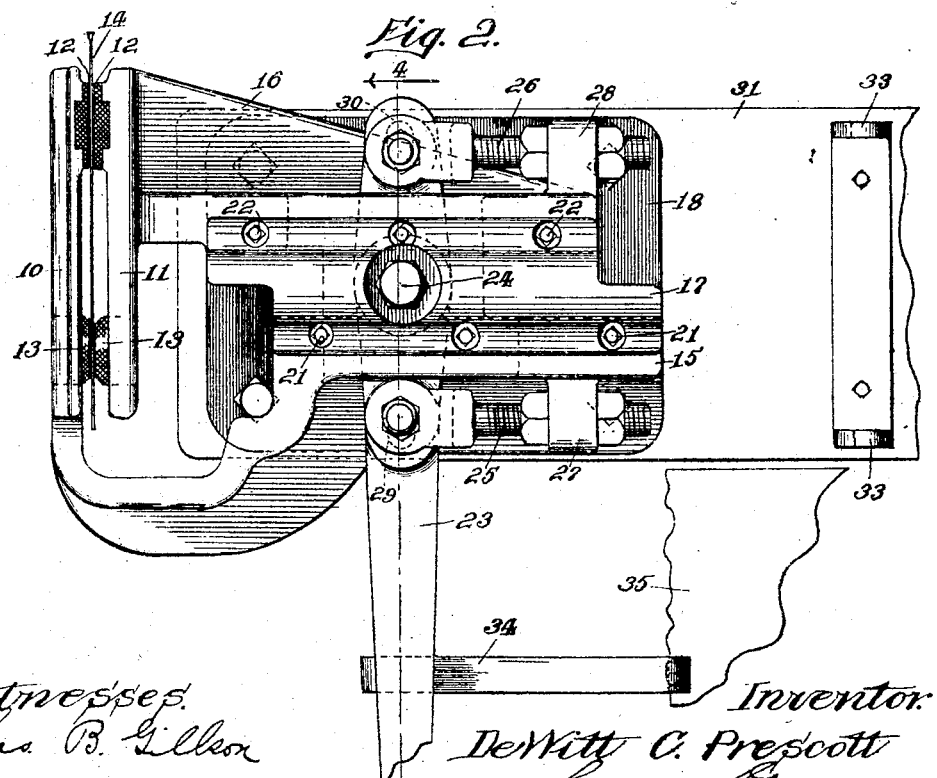
Figure 3:
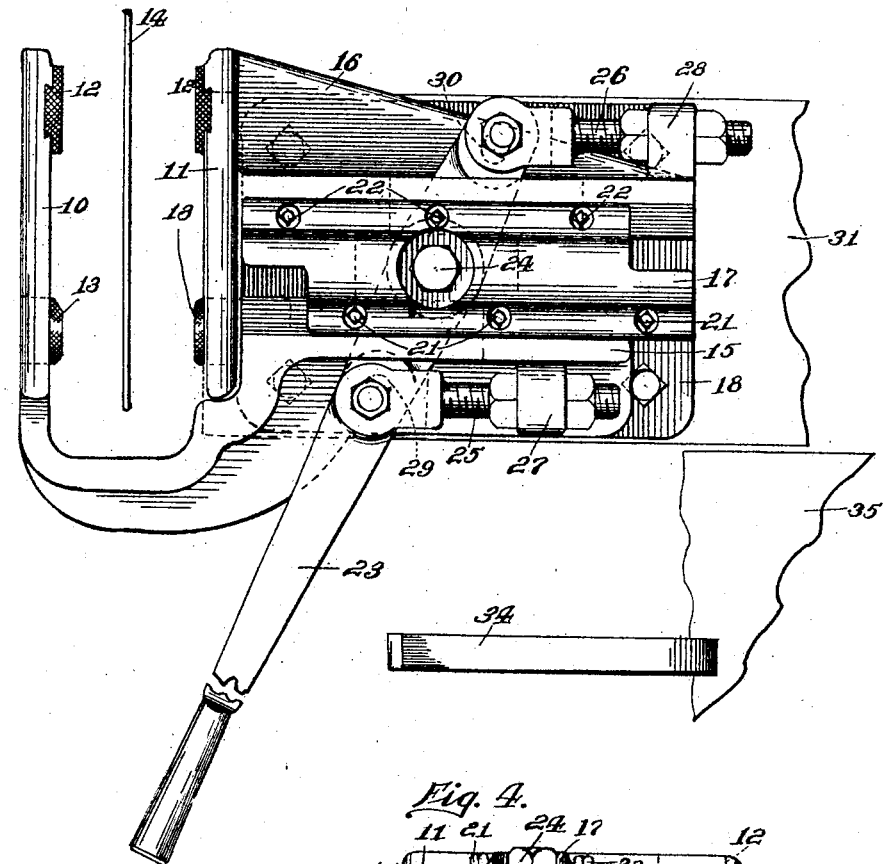
Figure 4:
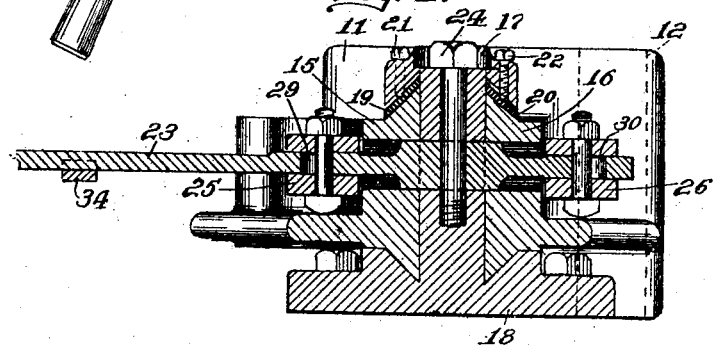

Figure 1 is a side elevation of the device, including a detail of the mill to which it is applied. Fig. 2 is a plan view of the device and certain parts of the mill. Fig. 3 is a similar view with the parts in a different position, and Fig. 4 is a sectional view on the line 4 4 of Fig. 2.

The more common practice in the use of band-saw mills for the manufacture of lumber has been to use a lower guide for the saw having fixed jaws. The movement of the saw is downward, and it carries with it the offal, consisting of sawdust, fragments of bark, slivers, &c. These are liable to wedge in between the saw and the jaw of the guide and cause serious trouble by occasioning friction and heating. Sometimes it becomes necessary to stop the mill and laboriously clean out the guide. An effort has been made to facilitate this cleaning operation by the employment of a removable inner jaw for the guide, reliance being had on the flexibility of the saw for cleaning the outer jaw; but this is only measurably successful.

The present invention comprises a pair of jaws 10 11, faced with antifriction material, such as Babbitt metal or wood, as shown at 12 12 13 13, so arranged that the saw 14 may pass between them. Each of these jaws is provided with a shank 15 16, running in horizontal ways perpendicular to the plane of the saw and formed in the side faces of a standard 17, rising from a bed-plate 18, adapted to be secured to a fixed part of the mill. The sides of the ways in the standard are undercut and the sides of the shank are complementary in form, and lost motion is prevented by the introduction of wear-plates 19 20, which are set up against the faces of the shanks by means of screw-bolts, as 21 22, entering through the top of the standard 17.

The jaws are controlled by a hand-lever 23, extending through the standard 17 and pivoted thereto by means of the screw-bolt 24, the shanks 15 and 16 of the jaws being apertured to allow free play of the lever therethrough. This lever is connected with the shanks of the jaws by the links 25 26, respectively, which are adjustably set, by means of suitable threads and jam-nuts, in lugs 27 28, projecting from the shanks of the jaws. These links may be rigid, as shown, and in that event the pivot-pins, by which they are attached to the lever 23, will run in longitudinal slots 29 and 30 therein.

The base-plate 18 is shown in the drawings as bolted to a portion of the shield 31 for covering the lower saw-wheel, and the guide is preferably covered by an apron 32, pivoted, as shown at 33, to this shield, so that it may be raised to give access to the guide. The hand-lever 23 extends laterally beyond the apron 32 and is in convenient reach of the operator standing upon the deck of the mill beside the saw-frame.

The jaws having been closed, as in Fig. 2, are held in that position, the lever 23 engaging a hook 34, attached to any suitable part of the frame of the mill, as shown at 35. This hand-lever may be readily detached from the hook by downward pressure upon the latter, which may be sufficiently elastic to permit of flexure for this purpose.

In practice the face-pieces 12 13 are barely out of contact with the face of the saw, and this nice adjustment of the jaws is secured by the employment of the threaded links 25 26.

I claim as my invention—

1. In a band-saw guide, in combination, a pair of reciprocating jaws, a standard carrying the jaws, and a lever pivoted to the standard intermediate of the shanks of the jaws and connected with each shank.

2. In a band-saw guide, in combination, a pair of reciprocating jaws, a standard carrying the jaws, a lever pivoted to the standard intermediate of the shanks of the jaws, and an adjustable link connecting the shank of each jaw with the lever.

3. In a band-saw guide, in combination, a pair of reciprocating jaws, a standard carrying the jaws, a lever pivoted to the standard intermediate of the shanks of the jaws, and a detent for engaging the lever when the jaws are closed.

4. In a band-saw guide, in combination, a pair of reciprocating jaws, a standard carrying the jaws, a lever pivoted to the standard intermediate of the shanks of the jaws, an adjustable link connecting the shank of each jaw with the lever, and a detent for engaging the lever when the jaws are closed.

DE WITT C. PRESCOTT.

Witnesses:
LOUIS K. GILLSON,
CHARLES B. GILLSON.